US008408482B2

(12) United States Patent
Gregory

(10) Patent No.: US 8,408,482 B2
(45) Date of Patent: Apr. 2, 2013

(54) SPRINKLER WITH PRESSURE REGULATION

(75) Inventor: Christian T. Gregory, La Crescenta, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 13/246,011

(22) Filed: Sep. 27, 2011

(65) Prior Publication Data

US 2012/0012678 A1 Jan. 19, 2012

Related U.S. Application Data

(60) Division of application No. 12/710,871, filed on Feb. 23, 2010, now Pat. No. 8,056,829, which is a continuation of application No. 11/175,609, filed on Jul. 6, 2005, now Pat. No. 7,681,807.

(51) Int. Cl.
*B05B 3/00* (2006.01)

(52) U.S. Cl. ........ 239/206; 239/203; 239/240; 239/570; 239/574; 137/116.3; 137/512

(58) Field of Classification Search ................... 239/201, 239/203–206, 240, 570, 574, 575, 284.1, 239/284.2; 137/116.3, 116.5, 505.11, 512, 137/512.3, 599.13, 601.2
See application file for complete search history.

(56) References Cited

U.S. PATENT DOCUMENTS

| | | | |
|---|---|---|---|
| 3,713,584 A | 1/1973 | Hunter | |
| 3,948,285 A | 4/1976 | Flynn | |
| 4,002,295 A | 1/1977 | Drori | |
| 4,026,471 A | 5/1977 | Hunter | |
| 4,501,391 A | 2/1985 | Hunter | |
| 4,562,962 A | 1/1986 | Hartman | |
| 4,913,352 A | 4/1990 | Witty et al. | |
| 5,123,597 A * | 6/1992 | Bendall | 239/124 |
| 5,375,768 A | 12/1994 | Clark | |
| 5,465,752 A | 11/1995 | Higgins | |
| 5,779,148 A | 7/1998 | Saarem et al. | |
| 5,823,440 A | 10/1998 | Clark | |
| 5,875,815 A | 3/1999 | Ungerecht et al. | |
| 6,026,850 A * | 2/2000 | Newton et al. | 137/505.41 |
| 6,186,413 B1 | 2/2001 | Lawson | |
| 7,134,613 B2 | 11/2006 | Kah, III | |
| 7,337,988 B2 | 3/2008 | McCormick et al. | |
| 2002/0162901 A1 | 11/2002 | Hunter et al. | |
| 2004/0164178 A1 | 8/2004 | Kah, Jr. | |

OTHER PUBLICATIONS

PEPCO Technical Bulletin, Medium Flow Regulator, PEPCO, Wade Rain Micro Irrigation Division, Fresno, California, undated, 2 pages.

* cited by examiner

*Primary Examiner* — Jason Boeckmann
(74) *Attorney, Agent, or Firm* — Fitch, Even, Tabin & Flannery, LLP

(57) ABSTRACT

A sprinkler pressure regulator module has a compact arrangement with a shiftable member having an upper cavity for receiving water flow debris, and a portion of a bypass valve may reciprocate therein. The module includes a stator plate directing water into a drive mechanism, such as a turbine drive mechanism. The shiftable member receives fluid flow from a radially outboard direction and is sealed with a cup portion receiving the shiftable member to define a cup cavity. A module exterior surface is separated from a sprinkler housing to define a vent cavity. A pressure release vent communicates with the cup cavity, a vent channel between the cup portion and the exterior surface, the vent cavity, and the exterior environment. The vent cavity and cup portion provide receptacles for debris deposit. Ribs around an opening of the vent channel with the vent cavity generally prevent debris from entering the vent channel.

14 Claims, 10 Drawing Sheets

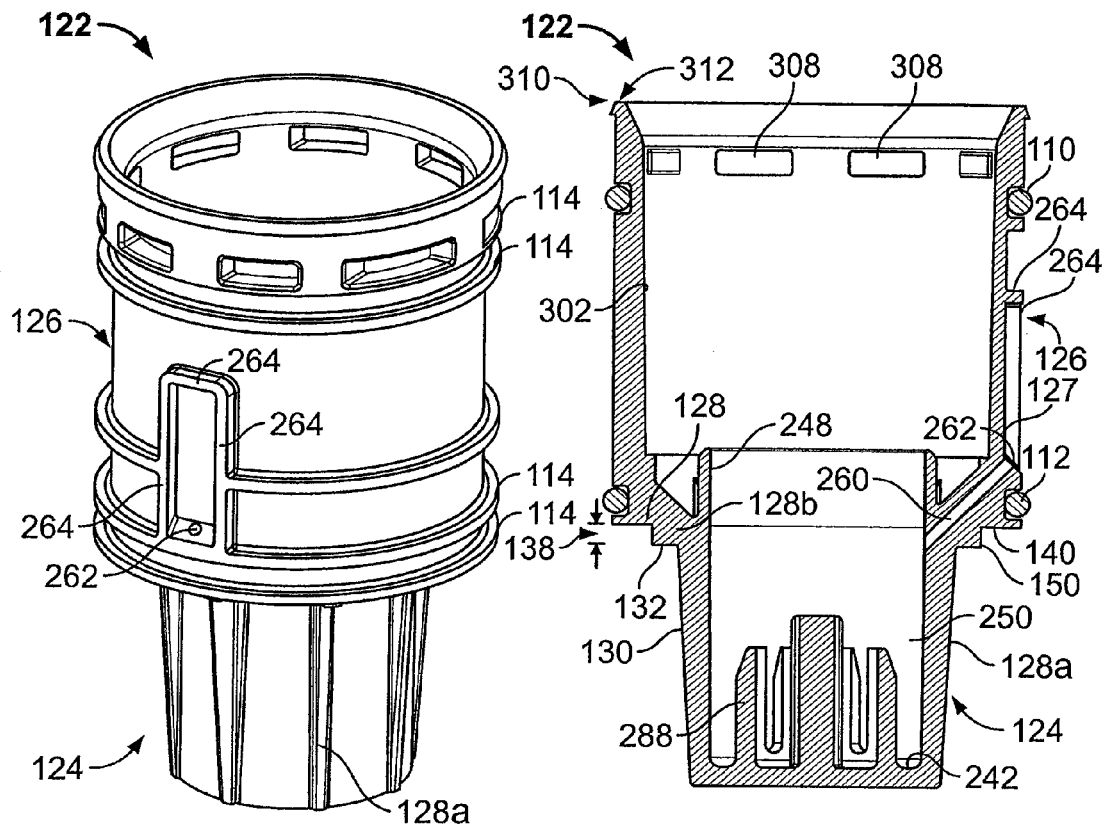
FIG. 4  FIG. 5
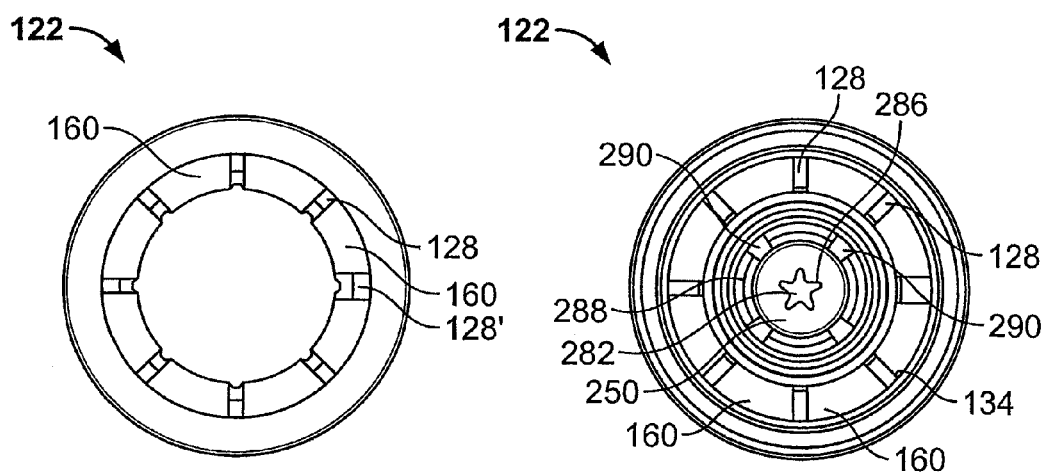
FIG. 6  FIG.7

SPRINKLER WITH PRESSURE REGULATION

CROSS-REFERENCE TO RELATED APPLICATIONS

This application is a divisional of prior application Ser. No. 12/710,871, filed Feb. 23, 2010, which is a continuation of prior application Ser. No. 11/175,609, filed Jul. 6, 2005, now U.S. Pat. No. 7,681,807 B2, which are hereby incorporated herein by reference in their entirety.

FIELD OF THE INVENTION

The invention relates to a pressure regulator for a sprinkler and, more particularly, to a pressure regulator located in the stem or moveable housing of a pop-up type sprinkler.

BACKGROUND OF THE INVENTION

Currently, pressure regulators are known in the art for use with sprinklers where the source water pressure may vary or otherwise be excessive for the sprinkler. Under ideal operating conditions, the internal pressure due to water flow would be relatively constant or at least within a specified, limited range. If the internal pressure exceeds the specified range, the sprinkler will not distribute water in a desirable manner. For instance, the water may be emitted at an excessive distance or force, and the desired coverage area will not be properly watered. Alternatively, a spinning-type sprinkler, having a head portion rotated by the force of the water flow, may spin too rapidly. In such a case, the emitted water stream or streams will not have time to develop the proper emission profile, instead "tailing" and being emitted a shorter distance than desired.

In simple terms, a pressure regulator is a mechanism having a portion or member that shifts positions depending on water pressure so that the water flow through the sprinkler remains within a desired range as the water pressure varies. A pressure regulator typically utilizes a pressure responsive moveable flow member that shifts within the water flow to regulate the size of a passageway around or through the moveable member and a stationary structure such as a pressure regulator valve seat. If the water pressure is excessive, the moveable member is shifted against the spring bias towards the structure so that the passage between the moveable member and the stationary structure is decreased in size. At ideal pressure, or below, the moveable member is biased by the spring away from the structure so as to maximize the size of the passage therebetween and to minimize the pressure drop across the interface between the moveable member and the valve seat.

In many cases, the moveable member is biased open and away from the valve seat. In some applications, the moveable member is biased towards the outlet or nozzle of the sprinkler and has a first face, downwardly directed into an incoming water stream, and a second face upwardly directed towards a cavity into which the water flows. As the water fills the cavity under pressure, the water exerts a pressure against both the first and second faces. By providing a larger surface area on the upwardly-facing second face than on the downwardly facing first face, the pressure acting downwardly on the moveable member is greater than the force acting upwardly. If there is a sufficient force differential between the faces, the spring bias is overcome and the moveable member is forced downward and towards the valve seat. The pressure regulator thereby acts to decrease the passageway between the moveable member and valve seat for the water, which consequently decreases the water flow and increases the pressure drop therethrough.

These types of pressure regulators are located in the flow of the water. As the water flows through the source pipe and through each component of the sprinkler itself, such as the inlet or pipe junctures, there is a pressure or head loss. If not located in close proximity to the sprinkler, the pressure regulator is subject to pressures which are not the same as those that would be experienced by the sprinkler head itself. It is therefore desirable for the pressure regulator to be closely located to the components of the sprinkler whose operation is effected by the water pressure.

A pop-up type sprinkler includes a case housing that connects to a source pipe for delivering water to the sprinkler. Within the case housing, a moving or moveable housing is located. The moveable housing is spring-biased to a retracted position so that it is located within the case when the sprinkler is not operating. When the sprinkler is activated, water is delivered to the sprinkler so that a water stream applies pressure to the moveable housing, thereby overcoming the spring bias and forcing the housing upward to a position extended from the case. The water continues through the moveable housing and is emitted by a sprinkler nozzle or outlet.

The pop-up sprinkler has a size which is dependent on the application and often includes a mechanism for allowing a sprinkler head portion of the moveable housing to rotate. For instance, a spinning-type sprinkler has a spinning deflector plate located above openings in the moveable housing through which water passes. The water strikes vanes of the deflector plate to cause the water to be distributed radially therefrom and to drive the deflector plate in a rotational manner. This type of sprinkler has a relatively small head portion.

In other cases, the moveable housing includes a drive train for converting the kinetic energy and force into rotational torque for controllably rotating the head portion of the moveable housing. The water is then emitted from the rotating head portion. Although some sprinklers have a speed control mechanism, in many types of sprinklers it is the pressure and flow rate of the water stream that are responsible for the rotation rate of the head portion. In use, control of the water flow through the drive train by a pressure regulator benefits from the pressure regulator being positioned upstream from the drive train.

Use of a conventional pressure regulator with a drive train can significantly increases the size, and in particular the length, of the moveable housing. The larger moveable housing may also requires a larger stem housing into which the moveable housing may retract. These factors contribute to an increase in cost and installation requirements.

In other applications, the pressure regulator may be located in the source pipe or upstream from a sprinkler head of any type. As described, the pressure regulator design utilizes a spring, which often requires a cavity within which the spring is located. This design benefits from the cavity being generally sealed from the pressurized water flow. If pressurized water is allowed to enter, the described pressure-differential is reduced or eliminated. However, the shifting of the moveable member causes the size of the cavity to be compressed and expanded. Therefore, the cavity is preferably vented to an ambient or reference pressure, such as the atmospheric environment.

Providing a vent can be problematic because the vent often provides a path for dirt and grit to enter the atmospheric or referential pressure cavity. Such entry may cause problems with the shifting of the moveable member, the moving of the spring, and the sealing between the moveable member and a support structure.

Accordingly, there has been a need for an improved pressure regulator, and a pressure regulator for use in compact constructions.

BRIEF DESCRIPTION OF THE DRAWINGS

FIG. 4 is a perspective view of a body of the pressure regulator showing a body cup and a body shell;

FIG. 5 is a cross-sectional view of the body of the pressure regulator of FIG. 1 showing an atmospheric vent positioned between two seals;

FIG. 6 is a bottom view of the body of the pressure regulator of FIG. 1 showing passageways separated by ribs for water flow entering the pressure regulator;

FIG. 7 is a top view of the body showing portions of a bearing assembly within the body cup;

DESCRIPTION OF THE PREFERRED EMBODIMENTS

Figure 1:
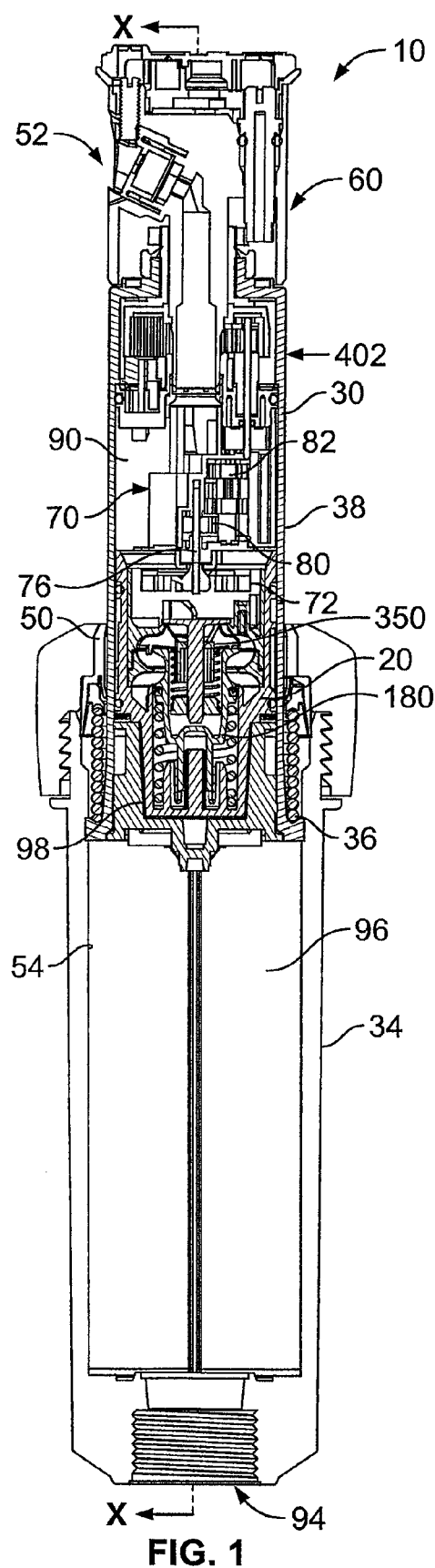
FIG. 1 is a cross-sectional view of a sprinkler including a moveable housing having a pressure regulator and a drive mechanism for rotating a head portion located on the moveable housing.
Figure 2:
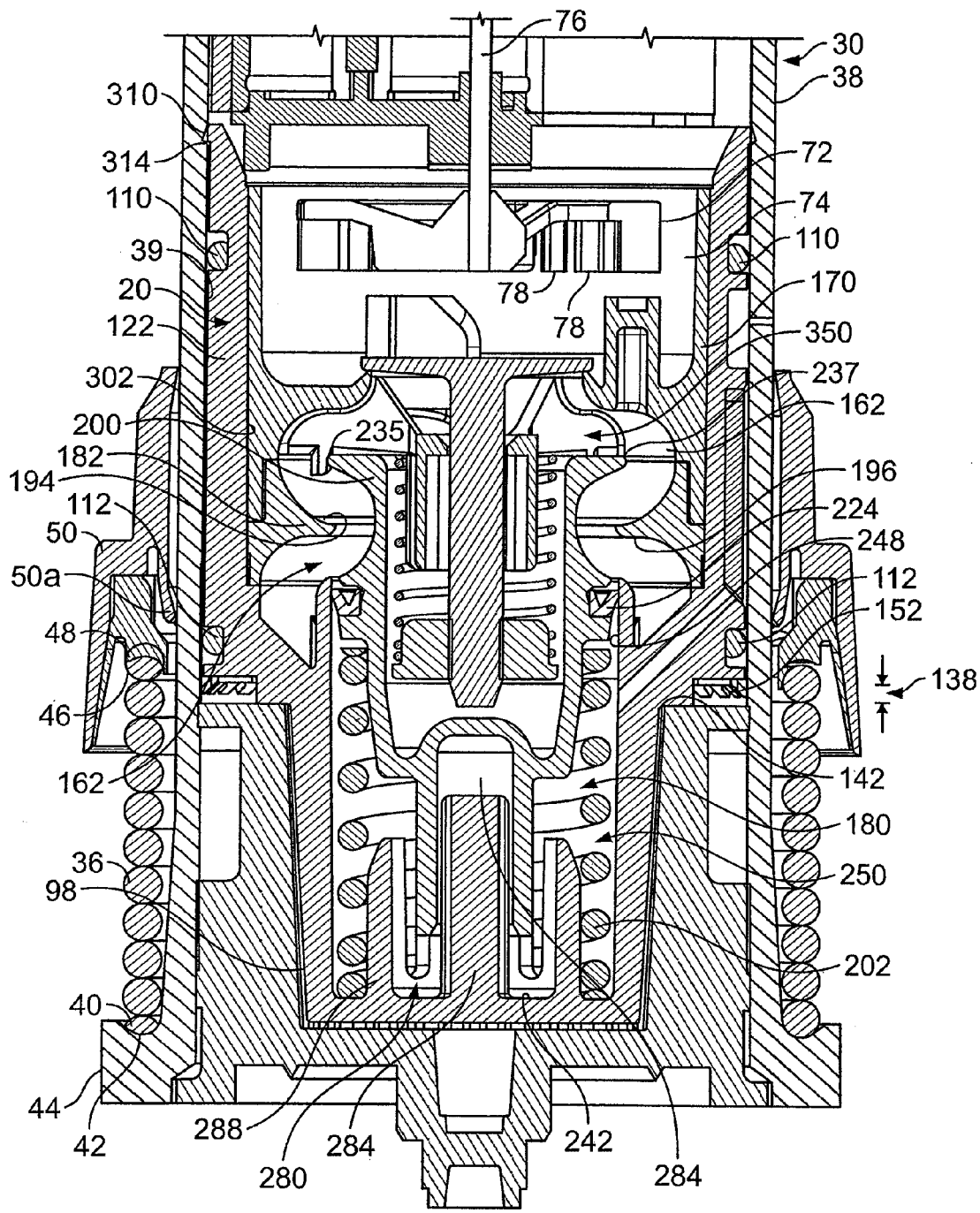
FIG. 2 is a cross-sectional fragmentary view of the sprinkler of FIG. 1 showing the moveable housing and showing the pressure regulator in a fully open position.

Referring initially to FIGS. 1 and 2, a compact design for a sprinkler 10 is depicted having a pressure regulator module or "PR" module 20 located within a moveable housing or riser 30. The sprinkler 10 is connected to a source pipe (not shown) for receiving a flow of water within the sprinkler 10. The sprinkler 10, as depicted, is a pop-up type sprinkler having a case 34 connected to the source pipe, and the riser 30 is allowed to reciprocate within the case 34. The riser 30 is biased downward into the case 34 to a telescopically retracted position on the case 34 by a retract spring 36 located around an exterior surface 38 of the riser 30. A spring bottom portion 40 contacts a shoulder 42 located proximate a lower portion 44 of the riser 30, while a top portion 46 of the spring 36 contacts a generally stationary shoulder 48 contained inside the case 34. Above the shoulder 48 is an annular wiper seal 50 secured within the case 34 and slidingly abutting in a sealing fashion the exterior surface 38 of the riser 30 so that water does not flow between the exterior surface 38 of the riser 30 and an interior surface 54 of the case 34. When the water source is turned on and the sprinkler 10 is activated, the pressure from the flow of water overcomes the force of the spring 36 to force the riser 30 from the retracted position to a telescopically extended position. In doing so, a nozzle 52 is exposed so that water may be emitted therefrom. The riser 30 is depicted in FIG. 1 in the extended position.

As shown, the riser 30 includes a sprinkler head 60 rotated around a central axis X by a drive mechanism 70. As the water flows through the sprinkler 10, the force of the water imparts energy for powering the drive mechanism 70. The sprinkler head 60 has a rotational friction that requires a torque to rotate, and the sprinkler head 60 has a preferred rotational speed. The drive mechanism 70 converts the energy from the water to rotational movement to achieve the preferred rotational speed and to create the requisite torque.

The drive mechanism 70 includes a turbine 72 located in an intermediate passageway 74 and an axle 76 which the turbine 72 rotates. The turbine 72 includes structure, such as vanes 78, that the water flowing through the intermediate passageway 74 impacts, thereby causing the turbine 72 to rotate. Above the turbine 72, a first gear 80 is connected to the axle 76 so that the turbine 72 and first gear 80 rotate together (see FIG. 1). The first gear 80 communicates with a drive train 82 having a gear reduction ratio to reduce the relatively high rotational velocity of the turbine 72 and first gear 80 to a lower velocity with increased torque. The drive train 82 transmits the high-torque, low-velocity motion to the head 60, thereby causing the head 60 to rotate about the axis X. The water, after passing through the turbine 72, flows through an upper flow passageway 90, generally located to one side of the drive train 82, and into the head 60 for emission by the rotating nozzle 52 in a radial pattern.

The sprinkler 10 includes a regulator valve assembly 180 and a bypass valve assembly 350 for controlling the path, pressure, and quantity of water flow through the sprinkler 10. Initially, the water enters the sprinkler 10 at an inlet 94 formed in a lower end of the case 34 and in communication with the source pipe. The inlet 94 communicates with a cavity 96 defined by the case 34 and by the bottom of the riser 30. The water then flows through a filter screen 98 in a lower portion of the riser 30. The filter screen 98 may be structured so as to receive a portion of the PR module 20 to reduce the axial space required for the sprinkler 10.

With reference to FIGS. 4-7, the PR module 20 has a body 122 that generally seals with an interior surface 39 (FIG. 2) of the riser 30 with upper and lower seals 110, 112 in the form of O-rings. The body 122 has a lower cylindrical cup 124 and an upper cylinder 126 interconnected by radially extending support ribs 128. The body 122 is, when installed, concentrically positioned along the axis X (FIG. 1) of the sprinkler 10. Each rib 128 has a lower elongated portion 128a that extends vertically along an exterior 130 of the cup 124 that is tapered radially outwardly from bottom to top, and the screen filter 98 is positioned generally around the cup 124. Each rib 128 also includes an upper radial portion 128b that includes a downwardly facing shoulder 132 a short distance below a junction 134 (FIG. 7) between the upper portion 128b of the rib 128 and the shell 126. The shoulder 132 defines the upper position of the screen 98 when the screen 98 is extended over the cup 124.

In addition, the shoulder 132 allows a gap 138 between a lower edge 140 of the shell 126 and a top portion 142 of the screen 98 (see FIGS. 2 and 5). The ribs 128 further form radially outwardly facing shoulders 150 spaced a distance from the riser interior surface 39. A retention mechanism 152 is secured in the gap 138 and between the shoulders 150 and the interior surface 39 for generally preventing the PR module 20 from shifting within the riser 30.

Figure 15:
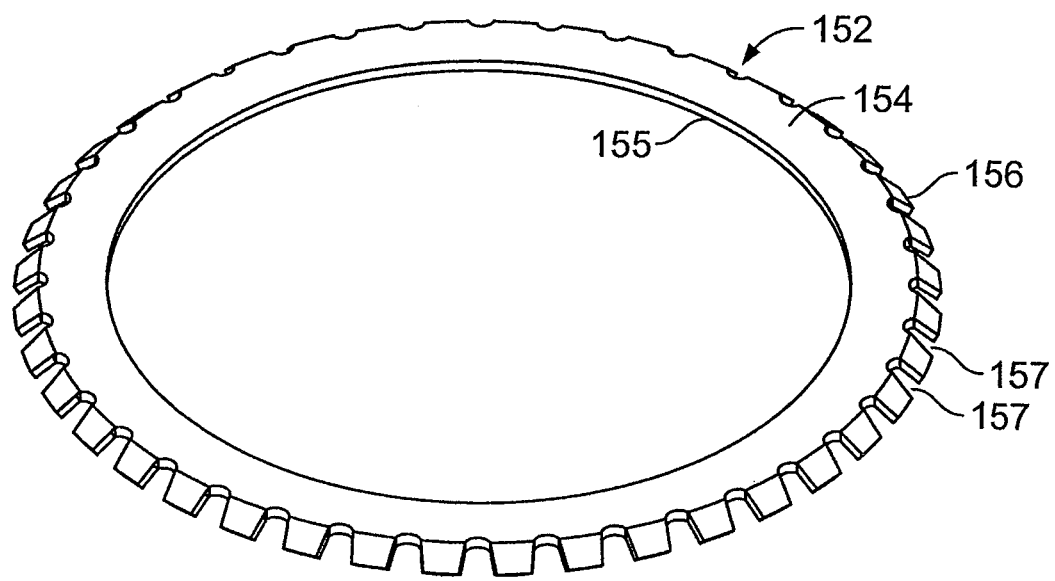
FIG. 15 is a perspective view of a retention mechanism of the sprinkler.

Preferably, the retention mechanism 152 is a washer-like member formed of metal having a central annular ring 154 surrounded by teeth 156 that radially extend and are inclined downward, as can be seen in FIG. 15. An inner edge 155 of the ring 154 is positioned with a small clearance around the shoulders 150, and the teeth 156 frictionally engage the interior surface 39. It should be noted that the retention mechanism may be provided as a generally planar component such that the teeth 156 extend radially from the ring 154 without an inclination.

During installation, the described incline may be imparted to the teeth 156 such that the teeth 156 resist moving downward within the riser 30. In this manner, the PR module 20 and retention mechanism 152 are easily installed from the bottom of the riser 30, while resisting forces that may otherwise force the PR module 20 to shift downwardly within the riser 30.

The retention mechanism 152 is positioned to reduce stress concentrations between itself and the riser 30. As can be seen in FIG. 2, the retention mechanism 152 is in contact with the interior surface 39 at a position below a pressure activated lip 50*a* of the wiper seal 50. At this position, the interior surface 39 and the exterior surface 38 of the riser 30 are at equal pressure, generally line pressure from the water input. Though the teeth 156 of the retention mechanism 152 may gouge the interior surface 39, the balance of pressure on each side of the riser 30 in this region reduces the likelihood that stress concentrations will result.

The water flows through the screen 98, around the cup 124, and into the PR module 20. More specifically, the upper portion 128*b* ribs 128 define openings 160 in the body 122, best seen in FIGS. 6 and 7. As the body 122 is sealed with the riser 30 by the seals 110, 112, the water does not flow around the PR module, instead being directed into the PR module 20. The interior of the PR module defines a lower passageway 162 (FIG. 2), with water entering the lower passageway 162 at the openings 160. The water exits the lower passageway 162 through a swirl stator 170 (FIG. 2) having an outer annular shell 172 and a central plate portion 174 (FIG. 10), features that will be discussed below.

Figure 3:
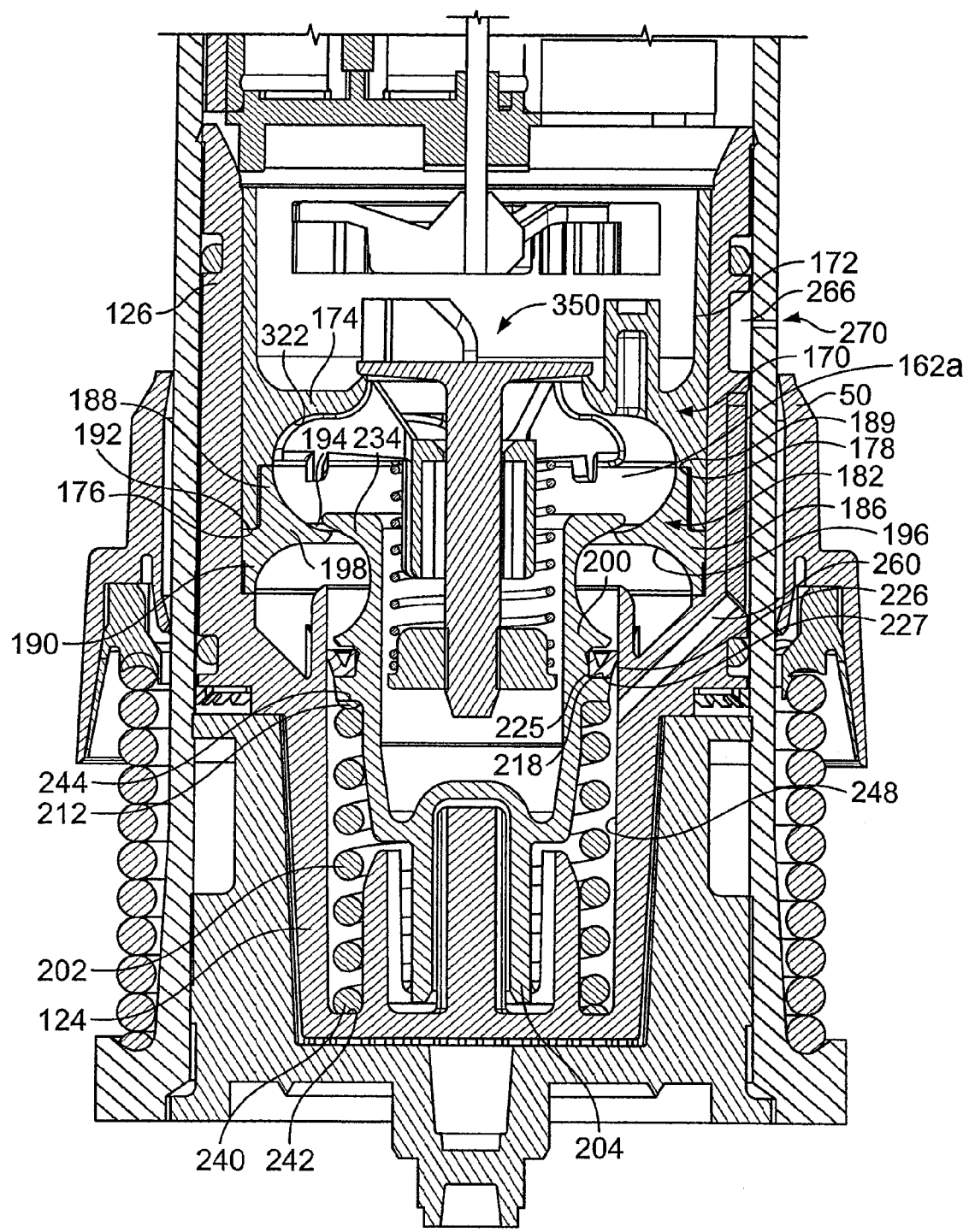
FIG. 3 is a cross-sectional fragmentary view of the sprinkler of FIG. 1 showing the pressure regulator in an fully closed position.

The PR module 20 includes the pressure regulating valve assembly 180 and the bypass valve assembly 350 for regulating the pressure and flow rate of water through the sprinkler 10. Each valve assembly 180, 350 has, in various forms, an upper head portion and a lower stem portion supporting the head portion. As can be seen in FIG. 3, the pressure regulating valve assembly 180 includes a stationary annular valve seat member 182 and a pressure responsive moveable member 200. The valve seat member 182 includes a generally annular stepped outer ring 186 having an upper section 188 and a lower section 190 with a greater diameter than the upper section 188 so as to form a shoulder 192 thereon. In assembly, the upper section 188 is received within the swirl stator shell 172, the lower section 190 has a diameter substantially equal to that of the exterior of the stator shell 172, and the shoulder 192 of the valve seat member 182 abuts a bottom surface 176 of the stator shell 172. Furthermore, the upper section 188 has a top surface 189 that abuts a shoulder 178 formed on the interior of the swirl stator plate portion 174. The diameters of the stator shell 172 and the lower section 190 are such that the stator shell 172 and lower section 190 are closely fitted within the body shell 126.

Extending radially inwardly from the valve seat member ring 186 is a seat portion 198 having an upper surface forming a valve surface 194 and a lower surface 196. The valve surface 194 arcs downwardly and towards the axis X, while the lower surface 196 arcs upwardly towards the axis X. In this manner, water flowing through the lower flow passageway 162 has a smooth, contoured path to minimize head loss.

The pressure regulating valve assembly 180 defines fully open and nearly closed positions for the PR module 20, respectively depicted in FIGS. 2 and 3. The fully open position represents a condition where the water pressure in the PR module 20 is sufficiently lower than a pre-determined pressure regulation value such that the moveable member 200 does not shift from its upwardly biased position, as shown in FIG. 2. The nearly closed position represents a condition where the water pressure into the PR module 20 is very high, the nozzle 52 has a small opening, or both. It should be noted that the PR module 20 does not fully close under normal operation. The PR module 20 is effectively moved towards a closed position by water flowing therethrough. Were the flow entirely cut-off, as would be the case with a fully-closed PR module 20, the water would not be flowing through such that the PR module 20 would immediately return to an open position.

The pressure regulating valve assembly 180 includes the pressure responsive moveable member 200 and a spring 202 biasing the moveable member 200 upward. In the fully open position, illustrated in FIG. 2, the moveable member 200 is spaced from the valve surface 194 so that the lower passageway 162 is open and water may pass therethrough, and the effect on the water flow through the passageway 162 is minimized. In contrast, the pressure regulating valve assembly 180 may be nearly closed by the moveable member 200 shifting downward against the spring 202 so that an upper flange 234, discussed below, is positioned in close proximity to the valve surface 194, as is illustrated in FIG. 3.

As can be seen in FIGS. 2, 3, 13 and 14, the moveable member 200 has a stepped exterior configuration that is first defined by a lower cylindrical bearing portion 204 and a frusto-conical section 206 tapering upwardly and outwardly. The lower end of the frusto-conical section has a diameter greater than that of the bearing portion 204 such that a shoulder 208 is formed therebetween. Above the frusto-conical section 206 is an intermediate cylindrical portion 210 having a diameter equal to the diameter of the upper end of the frusto-conical section 206. The intermediate cylindrical portion 210 forms a shoulder 212 with an annular extension 214 of greater diameter than the intermediate cylindrical portion 210. A groove 216 is defined by a top surface 218 of the annular extension 214 and a bottom shoulder 220 of a flow portion 222 formed at the upper portion of the moveable member 200. The groove 216 receives a seal member 224 (FIGS. 2 and 14), as will be discussed below.

As can be seen, the flow portion 222 is defined by an arcuate flow surface 230 divided into quarters by vertically extending ribs 232 positioned preferably at 90 degree intervals around the circumference of the flow portion 222. The arcuate surface 230 extends concavely inward toward the longitudinal axis of the moveable member 200. The flow surface 230 curves away from the central axis X (FIG. 1), increasing from a smallest middle portion towards the bottom shoulder 220 and the upper flange 234, and the upper flange 234 extends in the radial direction to a greater extent than does the bottom shoulder 220. In the almost fully closed position, the upper flange 234 almost seats on the valve surface 194, noted above. In the open position, and all positions between the open and almost closed positions, the valve surface 194, the flow surface 230, and the lower surface 196 of the valve seat member 182 define the lower passageway 162, as can be seen in FIG. 2, for example. The distance between the upper flange 234 and the valve surface 194 determines the amount of water flow permitted through the pressure regulating valve assembly 180 and, hence, the amount of pressure drop therethrough.

As noted above, the moveable member 200 includes a bearing portion 204, and the body 122 includes the cup 124 (see FIG. 5). The moveable member 200 and its associated spring 202 are received within the cup 124. More specifically, a bottom edge 240 or coil of the spring 202 rests on an interior bottom surface 242 of the cup 124, while a top edge 244 rests on the downwardly-facing shoulder 212 on the annular extension 214 so that the portions of the moveable member 200 below the annular extension 214 are received within the spring 202. The spring 202 fits around the intermediate cylindrical portion 210, and the frusto-conical portion 206 acts as a lead-in chamfer surface for installation of the spring 202 on the cylindrical portion 210. In this manner, the frusto-conical portion 206 does not provide appreciable resistance to movement of the moveable member 200 relative to the spring 202.

The spring 202 is sized so that, in the absence of any downward pressure on the moveable member 200, the spring 202 extends out from the cup 124. When assembled, the moveable member 200 and spring 202 are forced downward by, at the minimum, the swirl stator 170 contacting the upper flange 234. At this minimum compression, the seal 224 is located within the cup 124 and contacts an inner surface 248 thereof. The seal 224 thus prevents water from flowing into a cup cavity 250 defined by the cup inner surface 248, a moveable member outer surface 252 (FIG. 13), and the seal 224.

Figures 13, 14:
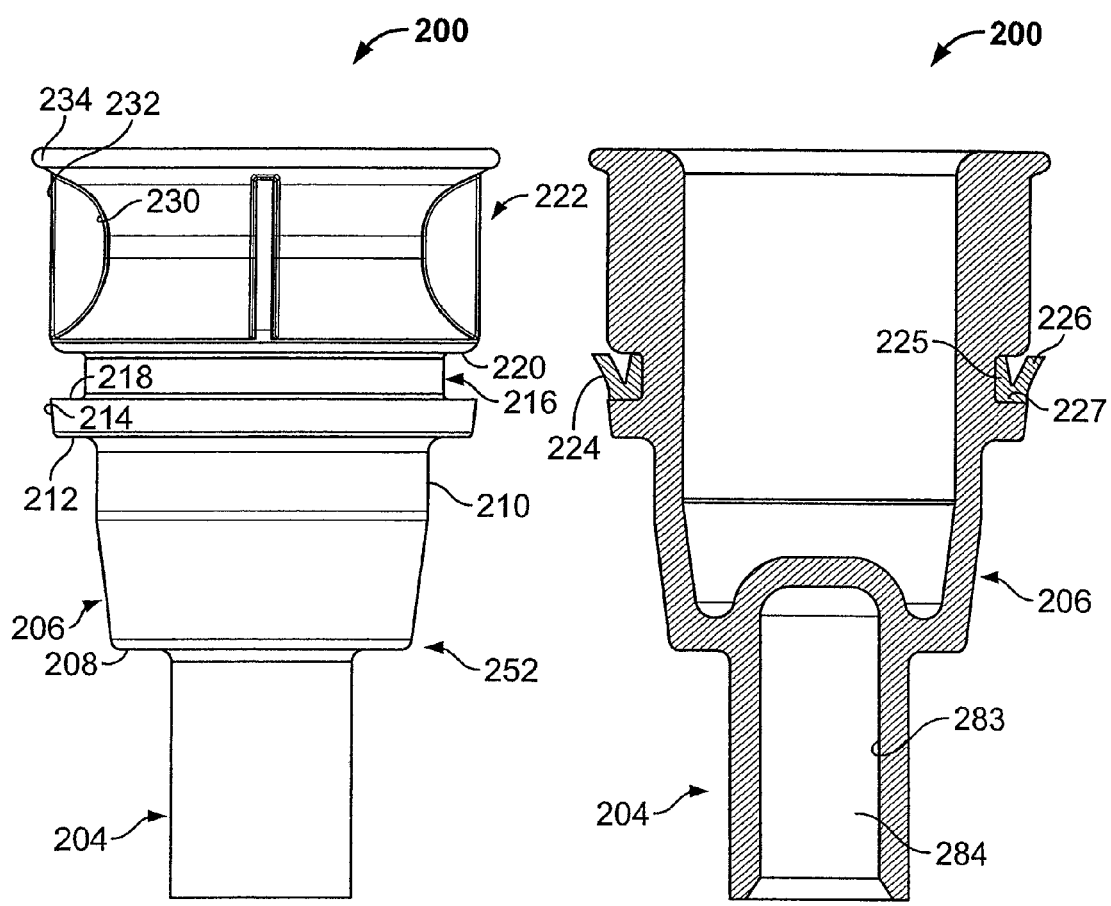
FIG. 13 is a side elevational view of a moveable member of the pressure regulator.
FIG. 14 is a cross-sectional view of the moveable member of FIG. 13 showing a cup-shaped interior cavity for receiving the bypass assembly therein.

With reference to FIGS. 2, 13, and 14, the seal 224 may be cup or V-shaped so as to have an inner annular portion 225 forming a base portion and an outer annular contact portion 226 extending upwardly and outwardly from a lower joint 227 therebetween. The lower joint 227 rests generally atop the annular extension top surface 218. The inner portion 225 extends about the moveable member 200 between the top surface 218 and the moveable member flow portion bottom shoulder 220. The outer portion 226 extends slightly outwardly from the moveable member 200 so as to form a resilient seal with the cup inner surface 248. The outer portion 226 also extends slightly upwardly so that the movement of the seal 224 with respect to the cup inner surface 248 requires less force in the downward direction. That is, when the moveable member 200 is forced downward, the outer portion 226 may deflect inwardly so that the resistance between the seal 224 and the cup inner surface 248 is reduced. In contrast, when the moveable member 200 is forced upwardly by its spring 202, the shaped of the outer portion 226 causes increased resistance to such a movement.

The seal 224 configuration provides a benefit in that fluid located within the cup cavity 250 may force itself out easier than other seal configurations. It is contemplated that water may force itself through the one or more of the seals described herein, such as the seal 224 or the wiper seal 50, and settle within the cup cavity 250. During sub-zero conditions, any water within the cup cavity 250 may freeze and expand. As the seal 224 is designed to deflect inwardly and pivot-like around the lower joint 227, expanding water (ice) due to freezing can relatively easily force itself through the interface between the seal 224 and the cup inner surface 248. It is believed, then, that this configuration may reduce damage to the PR module 20 in specific and the sprinkler 10 in general. Alternatively, an O-ring may be utilized as the seal 224.

To suit its purpose, the moveable member 200 may move between the minimum compressed position, shown as the fully open position of FIG. 2 where the upper flange 234 contacts the swirl stator 170 (as at 235, 237, FIG. 2), and a greater compressed position, such as that shown in FIG. 3. More broadly, the pressure regulation feature of the PR module 20 utilizes the shifting moveable member 200 to control the size of the lower passageway 162. The moveable member 200 has a variety of surfaces in fluid or pressure communication with the lower passageway 162, and it shifts in response to the pressure from the fluid flow being sufficiently greater than the spring bias to overcome the bias of spring 202.

As best seen in FIG. 2, the pressure regulating valve assembly 180 includes a bearing assembly 280 formed between the body cup 124 and the moveable member 200. With further reference to FIGS. 7 and 14, the cup 124 includes a central, axially aligned post 282 extending upward from the bottom surface 242 that is received in an axially aligned, vertical and cylindrical bearing cavity 284 formed in the moveable member 200 and extending through the bearing portion 204 and the frusto-conical section 206. The post 282 is preferably vertically splined to reduce the contact area between a bearing surface 286 (FIG. 7) of the post 282 and an interior surface 283 (FIG. 14) of the bearing cavity 284. For instance, the post 282 may have a cross-sectional profile of a five-pointed star, as illustrated in FIG. 7.

Surrounding and spaced a short distance from the moveable member 200 is a guide member 288 (FIGS. 2, 5, 7) which acts to align the spring 202. The guide member 288 is generally an annular or cylindrical wall extending upwardly from the bottom surface 242 and, preferably, has either vertical slots 290 (FIG. 7) formed in the wall or comprises a series of cylindrical wall sections separated by a short gap. The moveable member 200 is able to reciprocate within the cup 124, as described herein, and any fluid or debris that is able to enter the cup cavity 250 (FIG. 2) settles into the bottom of the cup 124. The slots 290 or gaps allow any fluid or debris to be moved from the path of the moveable member 200 and help prevent particulate matter from becoming entrapped between the bearing surfaces of the post 282 and the moveable member bearing surface 283. The guide member 288 further provides a defined path for the spring 202 to compress and decompress.

With reference to FIGS. 4-7, when the moveable member 200 shifts downwardly into the cup cavity 250, the volume therein decreases. In order to avoid an increase in pressure in proportion to the volume decreases, the cup cavity 250 is in fluid communication with a cup vent in the form of a channel 260 (FIGS. 3, 5). Referring to FIG. 6, one of the ribs 128 is a vent rib 128' with a larger dimension than the other ribs 128. The vent rib 128' includes the cup vent channel 260, formed as an internal passage within the rib 128', that allows the cup cavity 250 to communicate with a pressure sink, such as the atmospheric environment. Therefore, air in the cup cavity 250 can escape from, as well as enter into, the cup cavity 250 through the cup vent channel 260.

The cup vent channel 260 has an opening 262 on an outside surface 127 of the body shell 126. The vent opening 262 is surrounded by a series of walls 264 forming a rectangle and positioned between the upper and lower seals 110 and 112. Each seal 110, 112 is provided with a pair of annular ribs 114, and each seal 110, 112 itself is positioned between its respective rib pair. The seals 110, 112 and their ribs 114 essentially define a space, referred to herein as the vent cavity 266 (FIG. 3), sealed from the internal pressure of the riser 30 and the sprinkler 10, in general.

The differential between the pressure in the cavity 266 and within the riser 30 benefits the operation of the pressure regulating valve assembly 180 as a pressure regulator. In order for the pressure within the cup cavity 250 to remain at atmospheric pressure during operation with the riser 30 in the extended position, the vent cavity 266 communicates with a exit vent 270 formed in the riser 30 at a position so that the exit vent 270 is above the wiper seal 50 and communicates directly with the atmosphere.

The walls 264 are separated from the interior surface 39 of the riser 30 by a short distance, preferably in the order of 0.005 inches. In comparison, the exit vent 270 is approximately 0.025 inches and the vent channel 260 is approximately 0.040 inches. Were any debris to enter the exit vent 270 and pass into the vent cavity 266 (FIG. 3), such debris would have to be small enough to pass between the walls 264 and the riser interior surface 39. Therefore, the walls 264 and the interior surface 39 perform a straining function for keeping large particles from reaching the cup vent channel 260.

After the water passes through the lower passageway 162, it principally flows through the swirl stator 170. As stated above, the swirl stator 170 includes the stator shell 172 surrounding the stator plate 174. The stator shell 172 is generally cylindrical and sized to be received within and fit closely within the body shell 126 with close contact between a stator outer surface 300 and a body shell inner surface 302.

Figure 10:
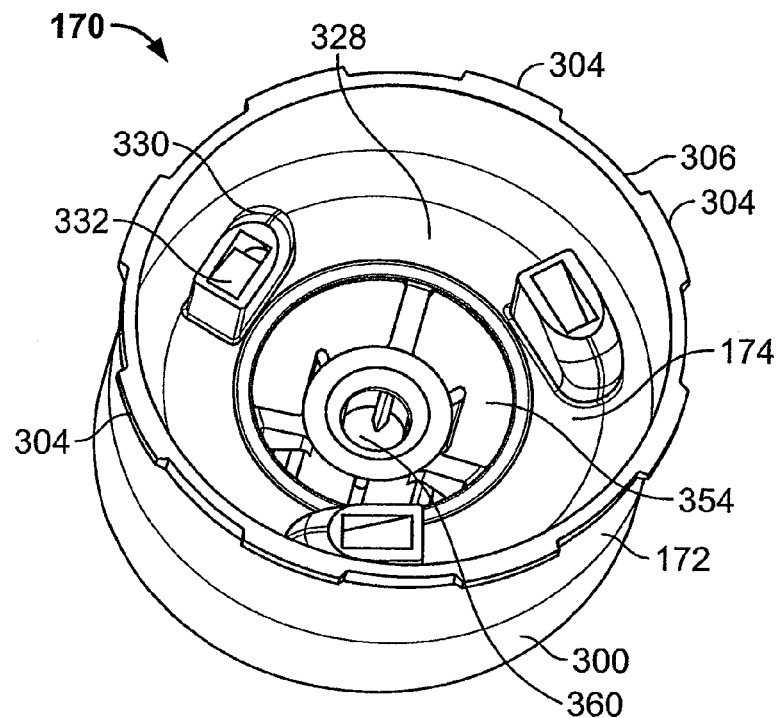
FIG. 10 is a perspective view of the swirl stator from the top.
Figure 11:
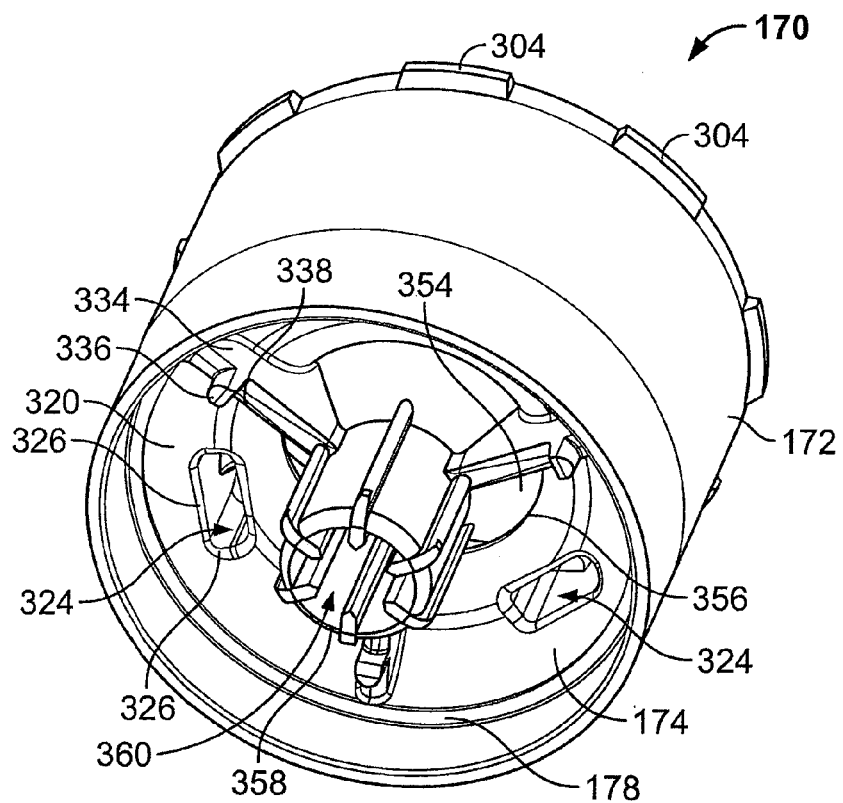
FIG. 11 is a perspective view of the swirl stator from the bottom.

As can be seen in FIGS. 2, 10 and 11, the stator outer surface 300 includes a series of annular prongs 304 extending radially outward and located proximate to a top edge 306 of the outer surface 300. The body shell 126 includes mating openings 308 so that, when the swirl stator 170 is inserted therein, the prongs 304 are received within the openings 308 to secure and position the swirl stator 170 therein. Once the swirl stator 170 has been secured within the body 122, the PR module 20 may be installed in the riser 30 and secured therein by an annular upper barb 310 located along a top edge 312 of the body shell 126, the upper barb 310 making an interference fit with a groove 314 on the interior surface 39 of the riser 30.

The stator plate 174 generally extends transversely across the interior of the stator shell 172. As noted herein, a bottom side 320 of the stator plate 174 includes the shoulder 178 for abutting the top of the valve seat member 182. Above the shoulder 178, the stator plate 174 and shell 172 are joined by a contoured arcuate surface 322 (FIG. 3) sloping upward and inwardly toward the axis X. This arcuate surface 322 smoothes the path of the water through the lower passageway 162, thereby reducing head loss.

Positioned on the bottom side 320 in a radial manner are flow openings 324 for allowing water to pass through the plate 174. In the preferred embodiment, there are three such openings 324, and edges 326 thereof may be rounded to reduce head loss and ease the flow of water therethrough. Each opening 324 passes from the bottom side 320 to a top side 328 for delivering water from the lower passageway 162 to the intermediate passageway 74 and the turbine 72. Surrounding each opening 324 on the top side 328 is a swirl director 330 for directing the water into the turbine 74. More specifically, the swirl director 330 includes an opening 332 pointed in a direction transverse to the axis X and, preferably, in a direction generally angled upwardly from a line tangential from the axis X. In this manner, the direction of the water flowing therethrough has an upward component so that the water flows towards the turbine vanes 78 and, more importantly, has a spiral flow path so that it provides a horizontal force component. The preferred vanes are generally vertical, and thus, the spiral flow and horizontal force component supplies the force used to rotate the turbine 74 for rotating the sprinkler head, as discussed above. In a preferred form, the swirl direct 330 and opening 332 produces a discrete stream or jet of water or fluid directed toward the vanes 78.

The swirl stator 170 further includes radial ribs 334 extending vertically downward from the plate bottom side 320. In the preferred embodiment, three radial ribs 334 are provided, each located between bottom side openings 324. When the swirl stator 170 is installed in the body 122, the ribs 334 contact the upper flange 234 of the moveable member 200 and force the moveable member 200 downward to compress the moveable member spring 202. Each rib 334 has an axial extension 336 located on a bottom edge 338 thereof, the axial extension 336 being positioned a short distance radially outboard from where the upper flange 234 contacts the rib 334. The axial extensions 336 serve to help maintain the moveable member 200 in proper vertical and axial alignment.

The vertical dimension of the ribs 334 provides a spacing between the moveable member 200 and the stator plate 174. In fact, fluid is generally free to flow through the volume between the moveable member 200 and the stator plate 174, and the pressure therebetween is equal to the pressure in an upper portion 162a of the lower passageway 162 (FIG. 3). Located above the moveable member 200 in the center of the stator plate 174 and axially aligned therewith is the bypass valve assembly 350.

The bypass valve assembly 350 acts to maintain a relatively constant rotation speed for the head 60, independent of the flow rate of the nozzle 52. Broadly speaking, the assembly 350 remains closed when a force differential applied to the assembly 350 remains lower than a specific threshold. More specifically, a portion of the assembly 350 is exposed to the pressure within the lower passageway 162 while another portion of the assembly 350 is exposed to the pressure within the intermediate passageway 74. As pressure on an area produces a force, the respective pressures act upon the portions to apply generally counterposed forces. When a differential between these forces that exceeds the threshold is applied, the assembly 350 is forced open, thereby allowing water to pass through the swirl stator 170 without passing through the swirl directors 330. Water passing through the assembly 350 has a generally vertical direction of flow and, thus, does not tend to apply a rotational force to the vertically positioned vanes 78 on the turbine 72. In fact, the vertical flow of water through the vanes 78 and in the intermediate passageway 74 may retard the motion of the turbine 72, thereby reducing the likelihood that the rotational velocity of the turbine 72 will become excessive. The assembly 350 is biased to the closed position by a bypass spring 352 such that the force differential created by the water pressures in the lower and intermediate passageways 162, 74 must overcome the bias force provided by the bypass spring 352 to open the assembly 350.

With reference to FIGS. 10 and 11, the bypass valve assembly 350 includes a circular bypass opening 354 concentrically formed in the center of the stator plate 174 and passing from the plate bottom side 320 and through the plate top side 328. The bypass opening 354 is in fluid communication with the volume above the moveable member 200 and, accordingly, with the lower passageway 162. Edges 356 of the bypass opening 354 on the bottom side 320 are rounded to reduce head loss through the opening 354. The radial ribs 334 are joined at a hub 358 having a central bore 360 coaxially aligned with the axis X such that the hub 358 is positioned below the bypass opening 354.

Figure 8:
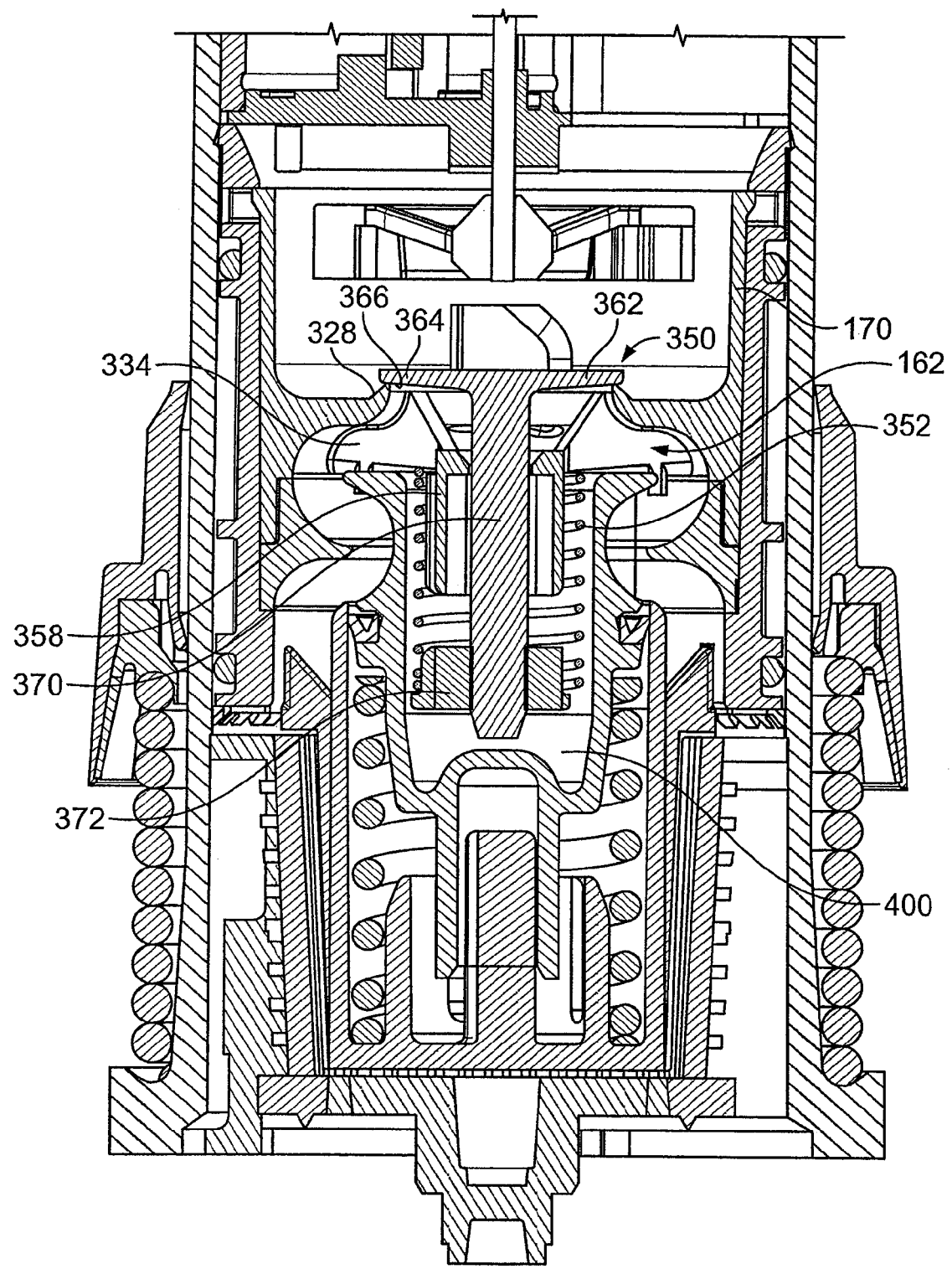
FIG. 8 is a cross-sectional view of a swirl stator for directing water streams into the drive mechanism and a bypass assembly in a closed position.
Figure 9:
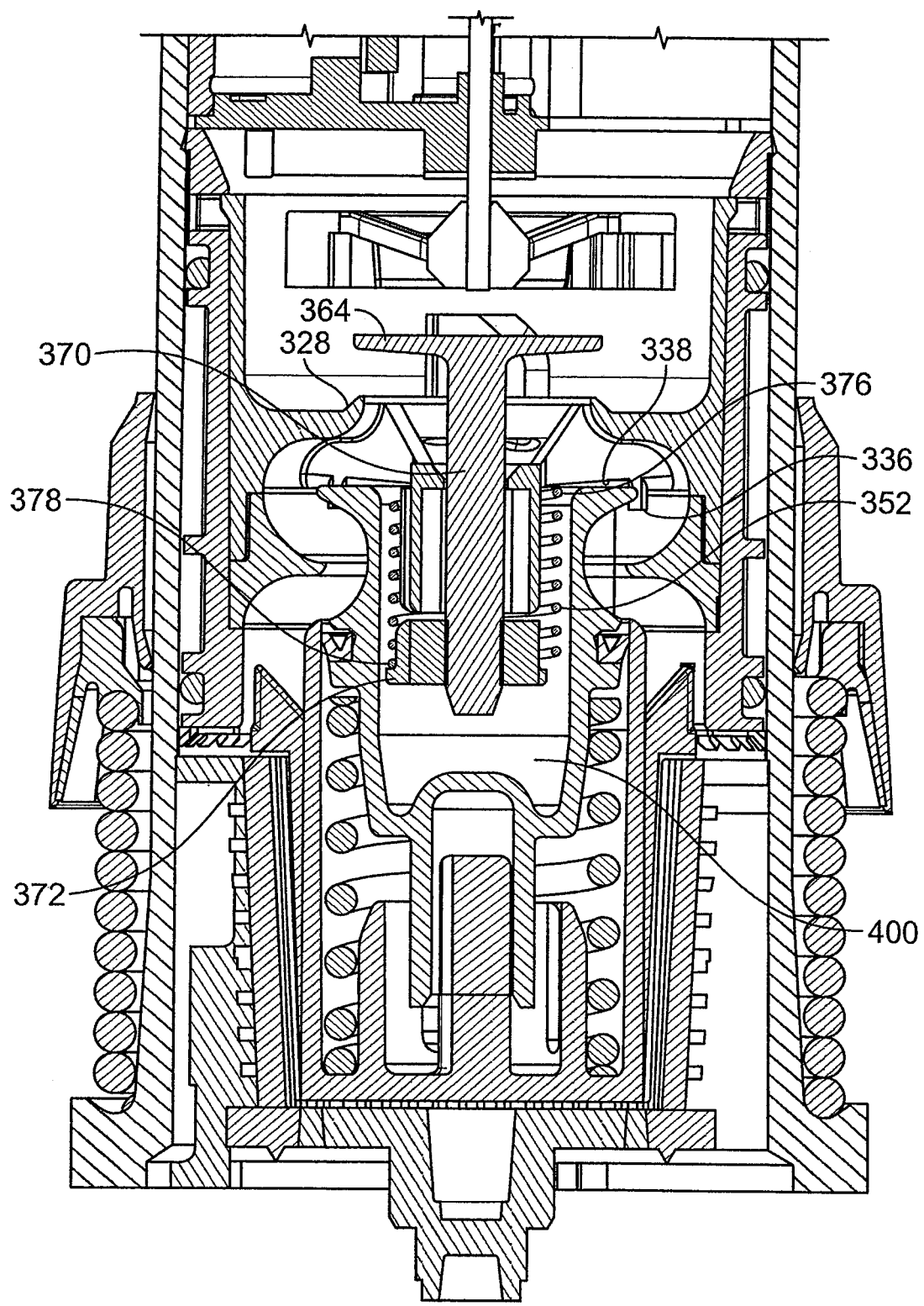
FIG. 9 is a cross-sectional view of the swirl stator of FIG. 8 showing the bypass assembly in an open position.

As can be seen in FIGS. 8 and 9, the bypass valve assembly 350 utilizes a reciprocating valve member 362 for opening and closing the assembly 350. The valve member 362 includes a circular valve plate 364 with a diameter greater than the diameter of the bypass opening 354. The valve member 362 is positioned above the bypass opening 354 so that a bottom side 366 of the valve member 362 rests on the plate top side 328 when the assembly 350 is closed, thereby preventing the flow of water through the bypass opening 354. Conversely, when force applied to the valve member 362 by the pressure in the lower passageway 162 is sufficiently greater than force applied by the pressure in the intermediate passageway 74 to exceed the threshold level, the valve member 362 is forced upward, thereby separating the valve plate 364 from the stator plate top side 328. As such, water is able to flow through the bypass opening 354, thus reducing the pressure within the upper portion 162a of the lower passageway 162. As discussed above, the water flowing through the bypass opening 354 does not contribute to rotating the turbine 72.

The valve member 362 further includes a central post 370 depending downward from the valve plate 364 and a spring retainer 372 secured to the bottom of the central post 370. The post 370 is located within the hub 358 and is shiftable up and down therewithin as the valve assembly 350 is opened and closed. The bypass spring 352 is positioned between the ribs 334 and the spring retainer 372 for biasing the spring retainer 372 downward away from the ribs 334.

More specifically, the bypass spring 352 is a coil spring having a top edge or coil 376 in contact with lower edge 338 of the ribs 334 and a bottom edge or coil 378 in contact with the spring retainer 372. Accordingly, a portion of the bypass spring 352 is positioned around the hub 358. In order for the assembly 350 to open, the valve plate 364 shifts upward, as do the post 370 and the spring retainer 372. In order for the valve member 362 to shift upward, the force differential across the valve member 362 must exceed the spring force of the bypass spring 352 to compress the bypass spring 352 between the spring retainer 372 and the ribs 334.

Figure 12:
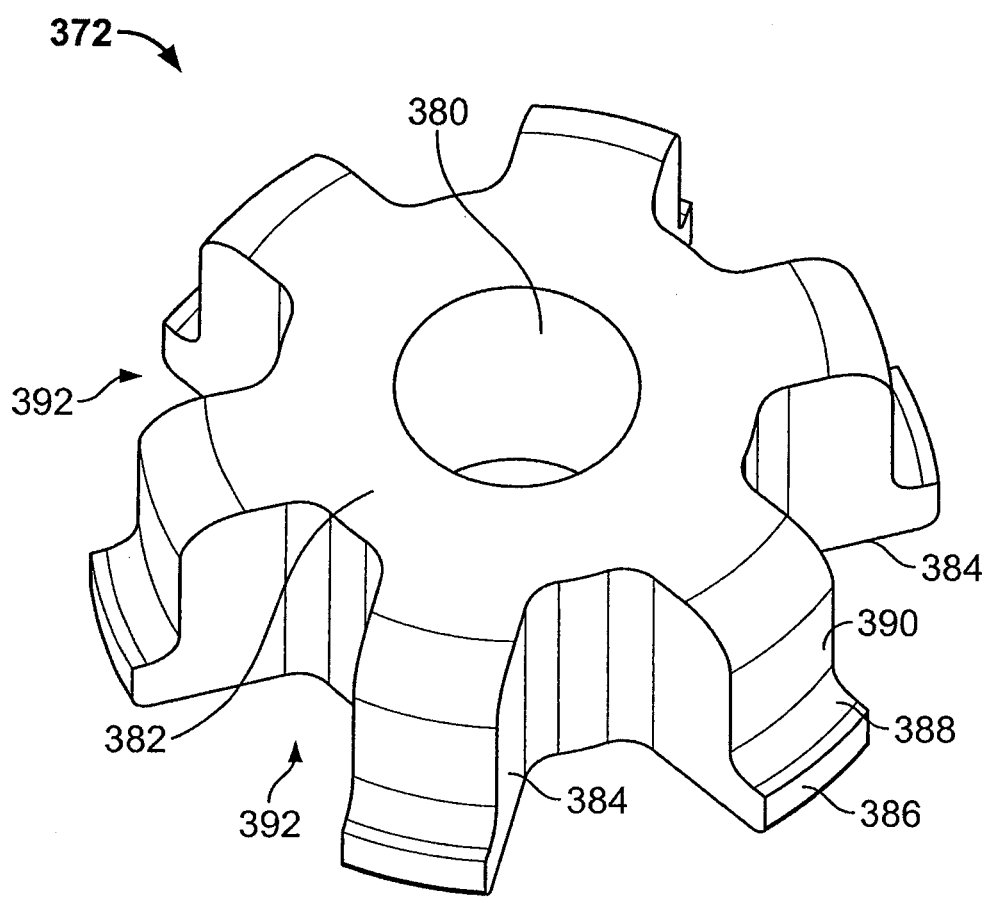
FIG. 12 is a perspective view of a retention member of the bypass assembly.

With reference to FIG. 12, the spring retainer 372 includes a bore 380 for receiving the central post 370 therein during assembly. Preferably, the post 370 and spring retainer 372 are permanently affixed together once assembled. The spring retainer 372 generally has a hub 382 defining the bore 380 and radial spokes 384 extending from the hub portion 382. The spokes 384 include terminal foot portions 386 having a reduced height so as to form a horizontal shoulder 388 and a vertical shoulder 390 thereon. The bottom coil 378 of the bypass spring 352 is positioned on top of the horizontal shoulder 388 while the vertical shoulder 390 is positioned within the bypass spring 352 so as to maintain the spring 352 in proper axial alignment. Between adjacent spokes 384 are gaps 392 so that particulate matter or debris that may be received within the spring 352 simply pass through and fall out of the bypass valve assembly 350.

The moveable member 200 has an upper cavity 400. As fluid flows above the moveable member 200, particulate matter therein may fall into the moveable member 200 so that the upper cavity 400 collects the debris so that the debris does not pass into the turbine or through other moving parts where the debris may cause binding or excessive wear.

The moveable member upper cavity 400 also provides the PR module 20 with a compact design. As can be seen, portions of the bypass assembly 350 reside in the upper cavity 400, particularly the central post 370 and the spring retainer 372.

As water enters the sprinkler 10, the riser 30 is forced to an extended position, and the exit vent 270 is exposed to the environment, as is depicted in FIG. 1. The water flows through the screen 98, enters the PR module 20 through the openings 160 in the body 122, and flows into the lower passageway 162. The water flows upward through the lower passageway 162 to the stator plate 174 and through the bottom side flow openings 324. The swirl directors 330 direct the water exiting the openings 324 into the turbine vanes 78 for driving the turbine 72 and drive train 82 and, thus, the sprinkler head 60. Particulate matter that is able to pass through the screen may be deposited in the upper cavity 400 of the moveable member 200. After passing through the turbine 72, the water flows through the upper passageway 90 for delivery to the sprinkler head 60 for emission in a radial manner.

If greater than a predetermined threshold, a force differential across the valve member 362 is sufficient to overcome the bias of the bypass spring 352, and the bypass valve assembly 350 shifts upward. This shift allows a portion of the water to flow through the bypass opening 354 in the stator plate 174. This flow will not be directed against the vanes 78 with a spiral flow horizontal force component. Thus, the rotational velocities of the turbine 72 and the sprinkler head 60 are controlled. Additionally, opening of the bypass valve assembly 350 reduces the pressure within the PR module 20. The predetermined threshold for opening the bypass valve assembly 350 is generally based on the spring constant of the bypass spring 352 and the pressure within the intermediate passageway 74, each of which depends on the sprinkler in which the PR module 20 is utilized.

The moveable member spring 202 has a spring constant greater than that of the bypass spring 352, and thus requires a greater force to compress. If the pressure in the lower passageway 162 is sufficient to compress the moveable member spring 202, the moveable member 200 will be forced downward. This causes the flow portion 222 of the moveable member 200 to move closer to the valve surface 194 of the valve seat member 182, thus narrowing the lower passageway 162 therebetween. In this manner, the flow rate through and the pressure within the lower passageway 162 in the region above the valve surface 194 are decreased. Accordingly, the force of the water passing through the swirl directors 330 and against the turbine vanes 78 is controlled as to be within the desired range. As the moveable member 200 is forced downward, the vent channel 260 from the cup 124 allows air or fluid to pass into the vent cavity 266 from where it may exit through the exit vent 270 to the environment.

According to the described sprinkler 10, the PR module 20 may be provided as a single unit for controlling the pressure and flow rate of water through the sprinkler, as well as the rotational velocity of the sprinkler head 60. The PR module 20 has a compact design including the bypass valve assembly 350 and the pressure regulating valve assembly 180 for regulating pressure and flow. As such, the bypass valve assembly 350 and pressure regulating valve assembly 180 are nested, such that the former is embedded within the latter. The compact size allows the PR module 20 to be retrofitted in sprinklers, though in some cases removing of an existing pressure regulator, bypass valve, or stator plate may be necessary. In addition, the compact size allows the PR module 20 to be included in sprinkler types that previously were considered too small to accommodate both a bypass valve and a pressure regulator. In fact, the PR module 20 may be included in a sprinkler below a drive mechanism, as has been described herein, for rotating a sprinkler head, as well as a direction-changing trip-mechanism 402 for reversing the direction of the sprinkler.

While the invention has been described with respect to specific examples, including presently preferred modes of carrying out the invention, those skilled in the art will appreciate that there are numerous variations and permutations of the above-described systems and techniques that fall within the spirit and scope of the invention as set forth in the appended claims.

What is claimed is:

1. A sprinkler for distributing water, the sprinkler comprising:
   a housing defining an interior surface; and
   a pressure regulating apparatus mounted in the housing, the pressure regulating apparatus including:
      a body wall having an exterior surface and defining an inlet for receiving water into the apparatus, an outlet for delivering water from the apparatus, a passageway between the inlet and outlet, and a first cavity surrounded by the wall;
      a pressure responsive member having at least a first radially outer surface portion defining a portion of the passageway where water pressure of water in the passageway exerts a force on the first radially outer surface portion, and at least a second surface portion of the pressure responsive member received in the first cavity at a generally constant reference pressure, the pressure responsive member shiftable in response to pressure of the water, and the first cavity generally sealed from the passageway to prevent the flow of water and air therebetween; and
      a valve seat in communication with the passageway, wherein the pressure responsive member moves towards the valve seat when pressure against the pressure responsive member exceeds a predetermined level to reduce the flow of water through the passageway; and
      the exterior surface of the body wall positioned a distance from the sprinkler housing interior surface and generally sealed therewith to define a second cavity in communication with the first cavity and in communication with an exterior environment of a portion of the sprinkler;
   wherein the housing includes:
      a stationary housing including an inlet for receiving water under pressure from a water source,
      a moveable housing received within the stationary housing and having a retracted position relative to the stationary housing when the sprinkler is shut off and having an extended position relative to the stationary housing with the sprinkler is activated to distribute water from a nozzle on the moveable housing, wherein the first cavity is defined by the pressure responsive member and a first cavity surface stationary relative to the moveable housing, and
      a first seal member positioned to form an interface between a portion of the pressure responsive member and the first cavity surface to generally prevent the flow of water and air across the interface.

2. The sprinkler of claim 1, wherein the apparatus may be pre-assembled as a unit, and the unit may be positioned within the sprinkler.

3. The sprinkler of claim 1, wherein static pressures of the first cavity, the second cavity, and exterior environment are substantially identical.

4. The sprinkler of claim 1, wherein the second cavity is formed between the exterior surface of the body wall secured within the moveable housing and the sprinkler interior surface formed on an interior surface of the moveable housing.

5. The sprinkler of claim 1, including a pressure release vent communicating with the first cavity and second cavity, and having an exit on the exterior of the moveable housing exposed to the environment outside the sprinkler when the moveable housing is in an extended position.

6. The sprinkler of claim 5, wherein the body wall includes a shell including the body wall having the exterior surface, the body wall is connected to a cup by at least a first radial rib portion, the cup includes an interior surface, a portion of which provides the first cavity surface, the pressure release vent includes a vent channel communicating with the first and second cavities, and the vent channel is formed in one of the radial rib portions.

7. The sprinkler of claim 6, wherein the shell portion includes an upper seal member and a lower seal member for generally sealing the shell with the moveable housing to define the second cavity.

8. The sprinkler of claim 7, wherein the vent channel communicates with the vent cavity at a position between the upper and lower seal members.

9. The sprinkler of claim 1, including a vent channel communicating between the first and second cavity, wherein the vent channel includes a vent opening into the second cavity, the exterior surface of the body wall includes wall portions extending therefrom and having a terminal end closely positioned to the sprinkler interior surface to restrict the size of a particle passing therebetween, the wall portions positioned around at least a portion of the vent opening.

10. A sprinkler for distributing water, the sprinkler comprising:
    a housing defining an interior surface; and
    a pressure regulating apparatus mounted in the housing, the pressure regulating apparatus including:
       a body wall having an exterior surface and defining an inlet for receiving water into the apparatus, an outlet for delivering water from the apparatus, a passageway between the inlet and outlet, and a first cavity surrounded by the wall;
       a pressure responsive member having at least a first radially outer surface portion defining a portion of the passageway where water pressure of water in the passageway exerts a force on the first radially outer surface portion, and at least a second surface portion of the pressure responsive member received in the first cavity at a generally constant reference pressure, the pressure responsive member shiftable in response to pressure of the water, and the first cavity generally sealed from the passageway to prevent the flow of water and air therebetween; and
       a valve seat in communication with the passageway, wherein the pressure responsive member moves towards the valve seat when pressure against the pressure responsive member exceeds a predetermined level to reduce the flow of water through the passageway; and
       the exterior surface of the body wall positioned a distance from the sprinkler housing interior surface and generally sealed therewith to define a second cavity in communication with the first cavity and in communication with an exterior environment of a portion of the sprinkler;
    wherein the body wall includes a stator having openings defining the outlet.

11. The sprinkler of claim 10, wherein the stator delivers water passing therethrough in the form of discrete streams, and the discrete streams are directed for delivering power to a drive mechanism.

12. A sprinkler for distributing water, the sprinkler comprising:
    a housing defining an interior surface; and
    a pressure regulating apparatus mounted in the housing, the pressure regulating apparatus including:
       a body wall having an exterior surface and defining an inlet for receiving water into the apparatus, an outlet for delivering water from the apparatus, a passageway between the inlet and outlet, and a first cavity surrounded by the wall;

a pressure responsive member having at least a first radially outer surface portion defining a portion of the passageway where water pressure of water in the passageway exerts a force on the first radially outer surface portion, and at least a second surface portion of the pressure responsive member received in the first cavity at a generally constant reference pressure, the pressure responsive member shiftable in response to pressure of the water, and the first cavity generally sealed from the passageway to prevent the flow of water and air therebetween; and a valve seat in communication with the passageway, wherein the pressure responsive member moves towards the valve seat when pressure against the pressure responsive member exceeds a predetermined level to reduce the flow of water through the passageway; and the exterior surface of the body wall positioned a distance from the sprinkler housing interior surface and generally sealed therewith to define a second cavity in communication with the first cavity and in communication with an exterior environment of a portion of the sprinkler;

wherein the body wall receives a stator including openings communicating with the outlet, wherein the openings direct fluid passing therethrough into contact with a drive mechanism of the sprinkler.

13. A sprinkler for distributing water, the sprinkler comprising:

a housing defining an interior surface; and a pressure regulating apparatus mounted in the housing, the pressure regulating apparatus including:

a body wall having an exterior surface and defining an inlet for receiving water into the apparatus, an outlet for delivering water from the apparatus, a passageway between the inlet and outlet, and a first cavity surrounded by the wall;

a pressure responsive member having at least a first radially outer surface portion defining a portion of the passageway where water pressure of water in the passageway exerts a force on the first radially outer surface portion, and at least a second surface portion of the pressure responsive member received in the first cavity at a generally constant reference pressure, the pressure responsive member shiftable in response to pressure of the water, and the first cavity generally sealed from the passageway to prevent the flow of water and air therebetween; and a valve seat in communication with the passageway, wherein the pressure responsive member moves towards the valve seat when pressure against the pressure responsive member exceeds a predetermined level to reduce the flow of water through the passageway; and the exterior surface of the body wall positioned a distance from the sprinkler housing interior surface and generally sealed therewith to define a second cavity in communication with the first cavity and in communication with an exterior environment of a portion of the sprinkler;

further including a bypass valve being embedded at least in part with the pressure responsive movable member and being located downstream of the pressure responsive movable member to bypass flow past the outlet when pressure at the outlet exceeds a predetermined threshold.

14. The sprinkler of claim 13, wherein the bypass valve includes a valve stem and a valve head, at least a portion of the valve stems extends into a cavity defined by the pressure responsive movable member.

* * * * *